(12) United States Patent
Yoshizawa (10) Patent No.: US 11,081,921 B2
(45) Date of Patent: Aug. 3, 2021

(54) ROTOR

(71) Applicant: HONDA MOTOR CO., LTD., Tokyo (JP)

(72) Inventor: Takuya Yoshizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 16/498,660

(22) PCT Filed: Mar. 27, 2018

(86) PCT No.: PCT/JP2018/012291
§ 371 (c)(1),
(2) Date: Sep. 27, 2019

(87) PCT Pub. No.: WO2018/181244
PCT Pub. Date: Oct. 4, 2018

(65) Prior Publication Data
US 2020/0099265 A1 Mar. 26, 2020

(30) Foreign Application Priority Data

Mar. 28, 2017 (JP) .............................. JP2017-062231

(51) Int. Cl.
*H02K 1/32* (2006.01)
*H02K 9/19* (2006.01)

(52) U.S. Cl.
CPC .................................. *H02K 1/325* (2013.01)

(58) Field of Classification Search
CPC ................................ H02K 1/276; H02K 9/19
USPC .................................................. 310/54, 400
See application file for complete search history.

(56) References Cited

U.S. PATENT DOCUMENTS

2009/0315423 A1* 12/2009 Suzuki ............... H02K 1/276
310/156.12
2010/0164310 A1* 7/2010 Dames .................. H02K 1/32
310/54

FOREIGN PATENT DOCUMENTS

| JP | 2009-219186 A | 9/2009 | |
| JP | 2010-004619 A | 1/2010 | |
| JP | 2010-239799 A | 10/2010 | |
| WO | WO-2013136405 A1 * | 9/2013 | ............... H02K 9/19 |
| WO | 2014129086 A1 | 8/2014 | |

OTHER PUBLICATIONS

International Search Report by ISA/JP dated Jun. 19, 2018, on PCT/JP2018/012291, 1 page.
Written Opinion by ISA/JP dated Jun. 19, 2018, on PCT/JP2018/012291, 5 pages.

* cited by examiner

*Primary Examiner* — Jose A Gonzalez Quinones
(74) *Attorney, Agent, or Firm* — Rankin, Hill & Clark LLP

(57) ABSTRACT

The rotor includes a shaft that allows cooling oil to flow therein; a substantially cylindrical rotor yoke fitted over the shaft; a magnet fitted to the rotor yoke; and a first end plate abutting on one end of the rotor yoke. In this configuration, the rotor yoke includes a cooling oil passage that is formed on a radially inner side of the magnet and allows the cooling oil to flow in an axial direction, the rotor yoke receives a pressing force in the axial direction via the first end plate, and the rotor yoke and the first end plate form a sealing part that seals the cooling oil, in a section positioned between the cooling oil passage and the magnet in the radial direction.

4 Claims, 9 Drawing Sheets

I-I CROSS SECTION

FIG.3

DETAIL OF PART A

FIG.4

II-II CROSS SECTION

ROTOR

TECHNICAL FIELD

The present invention relates to a rotor of a rotary electric machine.

BACKGROUND ART

A rotor of a rotary electric machine used in a vehicle or the like includes a rotor yoke having electromagnetic steel plates stacked together, and magnets fitted to the rotor yoke. Patent Literature 1 listed below discloses a technique of holding the rotor yoke and the magnets between a pair of end plates for the purpose of preventing the magnets from coming out of the rotor yoke and being sent flying out of the rotor yoke. Specifically, the endplates hold the rotor yoke and the magnets therebetween by pressing the rotor yoke and the magnets while being warped and deformed.

CITATION LIST

Patent Literature

Patent Literature 1: Japanese Unexamined Patent Application Publication No. 2010-4619

SUMMARY OF INVENTION

Technical Problem

Meanwhile, it is desirable to cool the rotor by supplying cooling oil from a shaft of the rotor to the parts of the rotor. In some cases, however, the pressing of the parts of the rotor by the end plates warps the rotor yoke and allows the cooling oil to leak from unexpected places, and makes it impossible to cool the rotor appropriately.

The present invention has been made in view of the above circumstances, and an object of the invention is to provide a rotor capable of cooling itself appropriately.

Solution to Problem

In order to solve the above problem, a rotor according to the present invention includes: a shaft that allows cooling oil to flow therein; a substantially cylindrical rotor yoke fitted over the shaft; a magnet fitted to the rotor yoke; and a first endplate abutting on one end of the rotor yoke, wherein the rotor yoke includes a cooling oil passage that is formed on a radially inner side of the magnet and allows the cooling oil to flow in an axial direction, the rotor yoke receives a pressing force in the axial direction via the first end plate, and the rotor yoke and the first end plate form a sealing part that seals the cooling oil, in a section positioned between the cooling oil passage and the magnet in a radial direction.

Advantageous Effects of Invention

The present invention makes it possible to cool the rotor appropriately.

DESCRIPTION OF EMBODIMENTS

First Embodiment

Configuration of First Embodiment

Figure 1:
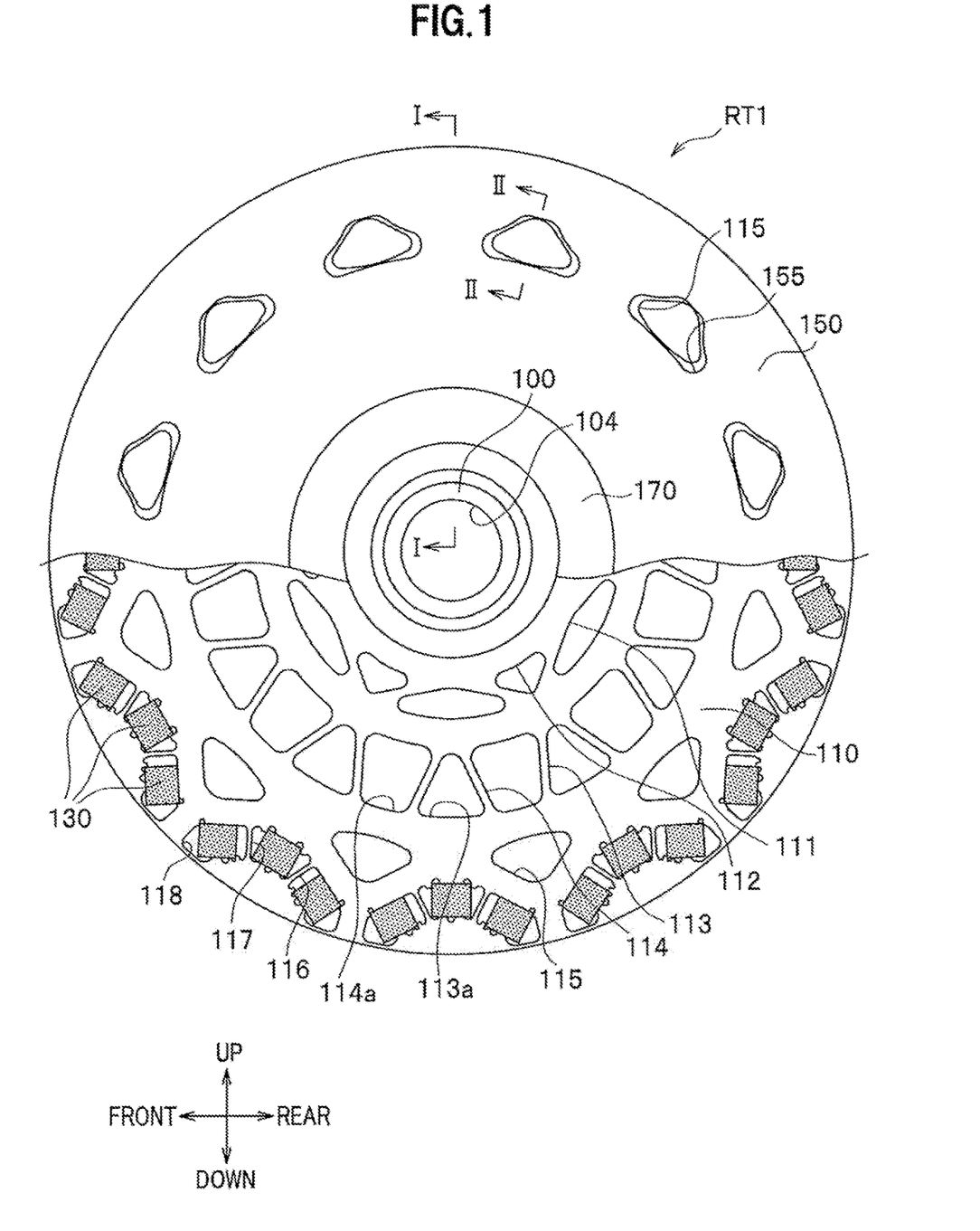
FIG. 1 is a front cutaway view of a rotor according to a first embodiment of the present invention.

FIG. 1 is a front cutaway view of a rotor RT1 according to a first embodiment of the present invention.

It should be noted that the rotor RT1 is applied to a rotary electric machine for a vehicle and works as an electric motor or a generator. In the drawings, a "front-rear" direction and an "up-down" direction are relative to a direction in which a vehicle with the rotor RT1 installed therein moves. A "left-right" direction is vertical of each sheet with a drawing thereon.

The rotor RT1 includes: a shaft 100 formed in a substantially cylindrical shape; a substantially cylindrical rotor yoke 110 fitted over the shaft 100; and magnets 130 embedded in the rotor yoke 110. The rotor yoke 110 is obtained by: stacking electromagnetic steel plates, formed in substantially the same shape, in the left-right direction (the direction vertical to the sheet with the drawing thereon); and joining the plates together by swaging, bonding, or welding. A hollow part 104 of the shaft 100 is a passage that allows cooling oil (not illustrated) to flow through.

Figure 2:
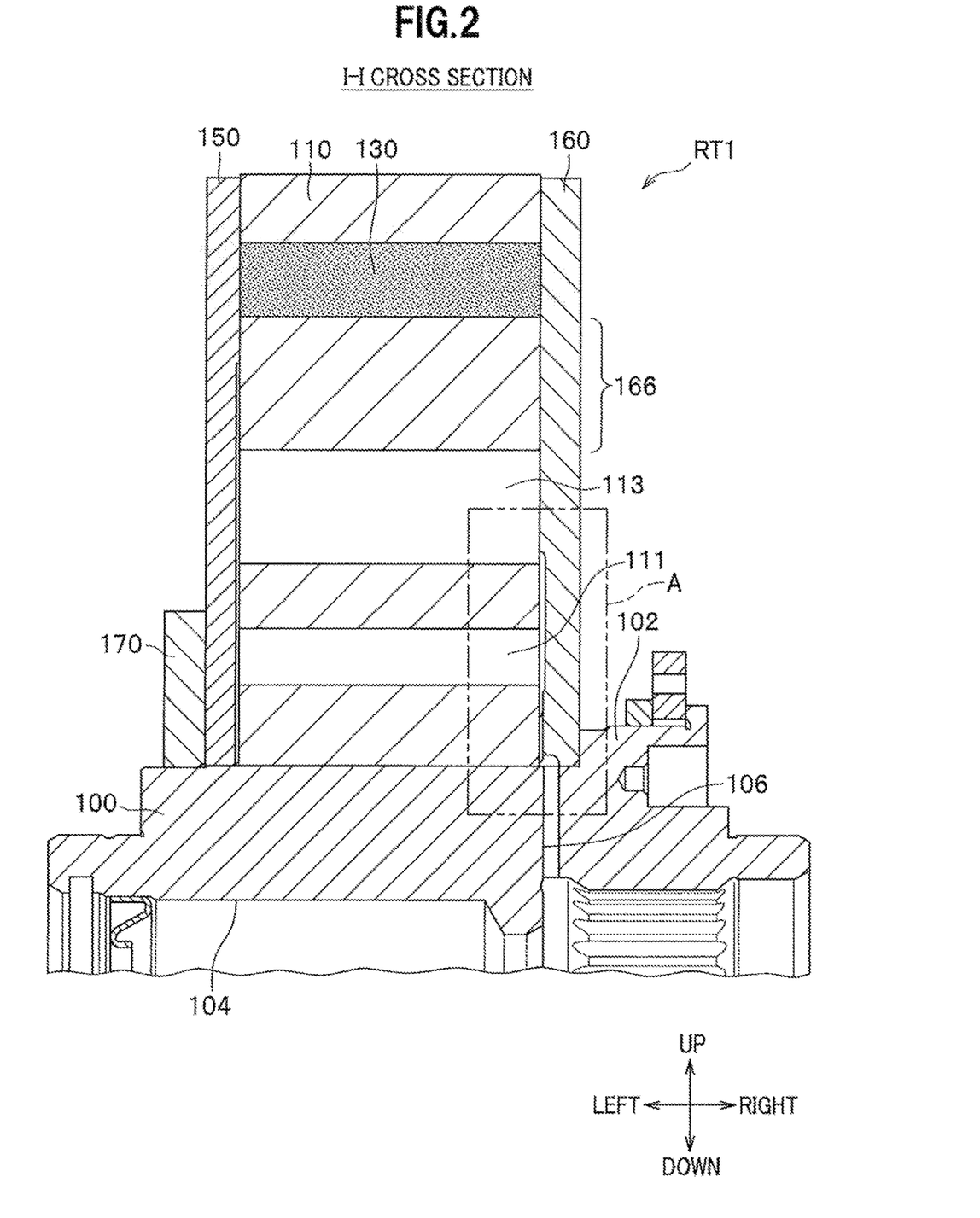
FIG. 2 is a cross-sectional view taken along the I-I line in FIG. 1.

FIG. 2 is a cross-sectional view taken along the I-I line in FIG. 1.

An end plate 150 (a second end plate) and an end plate 160 (a first end plate) abut on the left and right end surfaces of the rotor yoke 110, respectively. The end plates 150, 160 fix the magnets 130 inside the rotor yoke 110, and prevent the magnets 130 from coming out of the rotor yoke 110 and being sent flying out of the rotor yoke 110. The press-fit ring 170 is press-fitted over the shaft 100.

At the right side of the end plate 160, a large-diameter part 102 with an outer diameter greater than that of the shaft 100 is formed on the shaft 100. The end plates 150, 160 and the rotor yoke 110 are held between the large-diameter part 102 and the press-fit ring 170, and are pressed in the axial direction (the left-right direction) by the large-diameter part 102 and the press-fit ring 170. In addition, a cooling oil feeding hole 106 is formed in a portion of the shaft 100 which is slightly leftward of the large-diameter part 102. The cooling oil feeding hole 106 penetrates through the shaft 100 from the hollow part 104 to outer peripheral surface of the shaft 100. In FIG. 2, a section of the end plate 160 from cavities 113 to the magnets 130 has a flat left surface, which is referred to as a "flat part 166." On some portion of the flat part 166, the end plate 160 and the rotor yoke 110 are in contact with each other.

Referring back to FIG. 1, multiple cavity parts 111 to 118 for reducing the weight of the rotor yoke 110 are formed in the rotor yoke 110. To begin with, the cavities 111 each with a substantially elliptical cross section and the cavities 112 each with a substantially triangular cross section are alternately formed in a circumferential direction in a portion of the rotor yoke 110 which is located around an inner periphery of the rotor yoke 110. The cavities 113 each with a substantially triangular cross section and the cavities 114 each with a substantially trapezoidal cross section are alternately formed in the circumferential direction in a portion of the rotor yoke 110 which is located on a radially outer side of the cavities 111, 112. In this respect, one characteristic of this embodiment is that outer peripheral surfaces 113a, 114a of the respective cavities 113, 114 (cooling oil passages) are arranged on the same circle.

Furthermore, the cavities 115 each with a substantially triangular cross section are formed in equal intervals in a portion of the rotor yoke 110 which is located on a radially outer side of the cavities 113, 114. The cavities 116, 117, 118 in which to embed the magnets 130 are formed in predetermined intervals in the circumferential direction in a portion of the rotor yoke 110 which is located on a radially outer side of the cavities 115. Through-holes 155 with substantially the same shape as that of the cavities 115 are formed at positions on the end plate 150 which correspond to the cavities 115. Incidentally, through-holes (not illustrated) which are the same as the through-holes 155 are formed at positions on in the endplate 160 (see FIG. 2) which correspond to the cavities 115.

Figure 3:
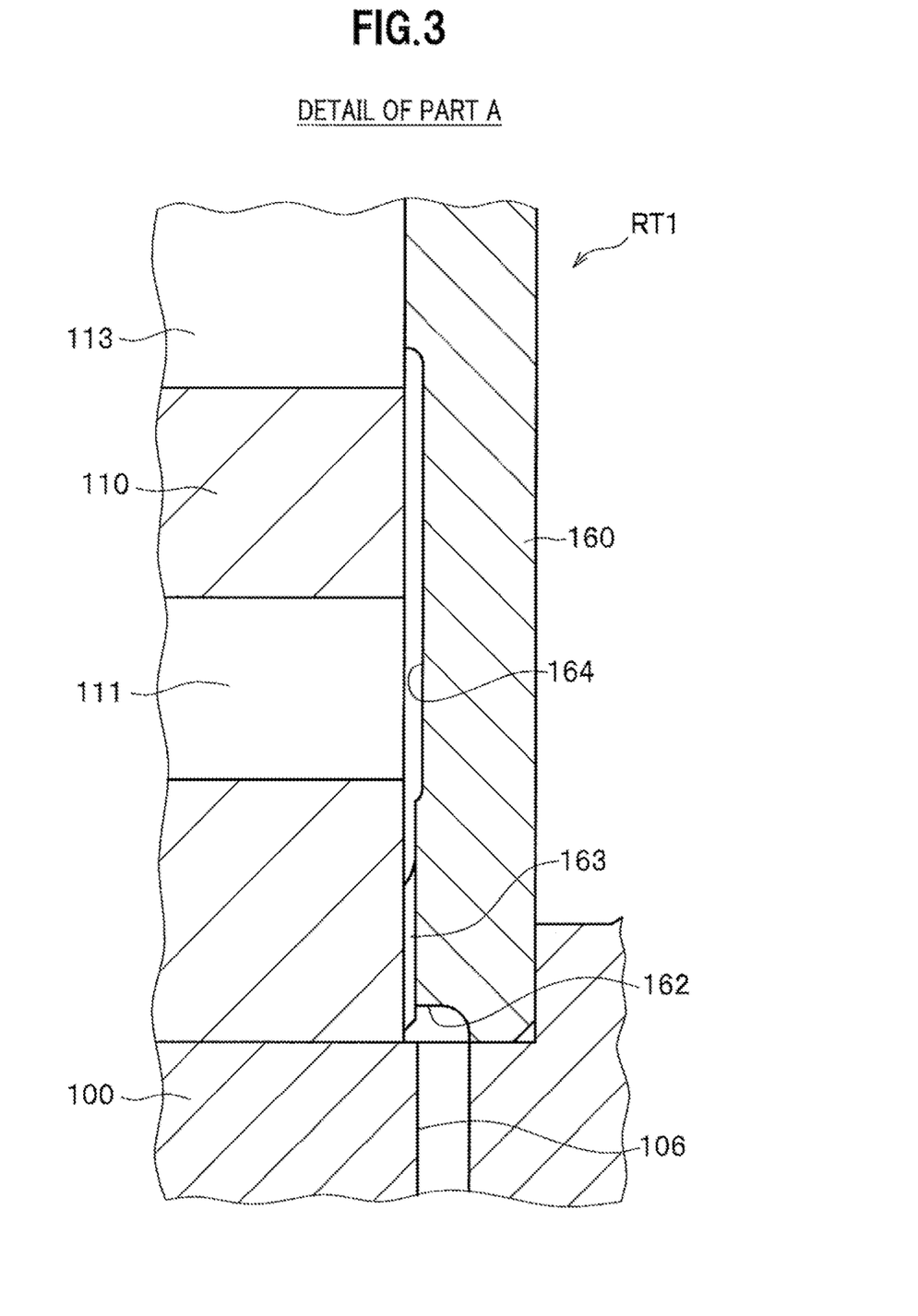
FIG. 3 is a detailed view of a part A in FIG. 2.

FIG. 3 is a detailed view of a part A in FIG. 2. A portion of the end plate 160 which faces the cooling oil feeding hole 106 is cut in a groove shape extending in a circumferential direction, and thereby forms an annular notch part 162. Furthermore, a recessed part 164 is formed in the left surface of the end plate 160. Furthermore, the recessed part 164 is set further back in a substantially annular shape than the rest of the left surface, and extends from the annular notch part 162 to opening portions of the respective cavities 113. In addition, projecting parts 163 are formed at arbitrary positions on the recessed part 164. The projecting parts 163 project leftward, and abut on the rotor yoke 110.

The projecting parts 163 abut on the rotor yoke 110, thereby holding clearance between the recessed part 164 and the rotor yoke 110. After supplied to the annular notch part 162 through the cooling oil feeding hole 106, the cooling oil is filled throughout the annular notch part 162 in the circumferential direction. During the rotation of the rotor RT1, the centrifugal force makes the cooling oil, filled in the annular notch part 162, flow along the recessed part 164 toward the outer periphery of the rotor RT1 to reach the cavities 113 and the cavities 114 (see FIG. 1). Incidentally, although FIG. 3 illustrates only one cooling oil feeding hole 106, it is desirable that for the purpose of supplying the cooling oil to the cavities 113 and the cavities 114 quickly, multiple cooling oil feeding holes 106 be formed in portions of the shaft 100 which correspond to two to six equal parts into which the shaft 100 is divided in the circumferential direction.

Figure 4:
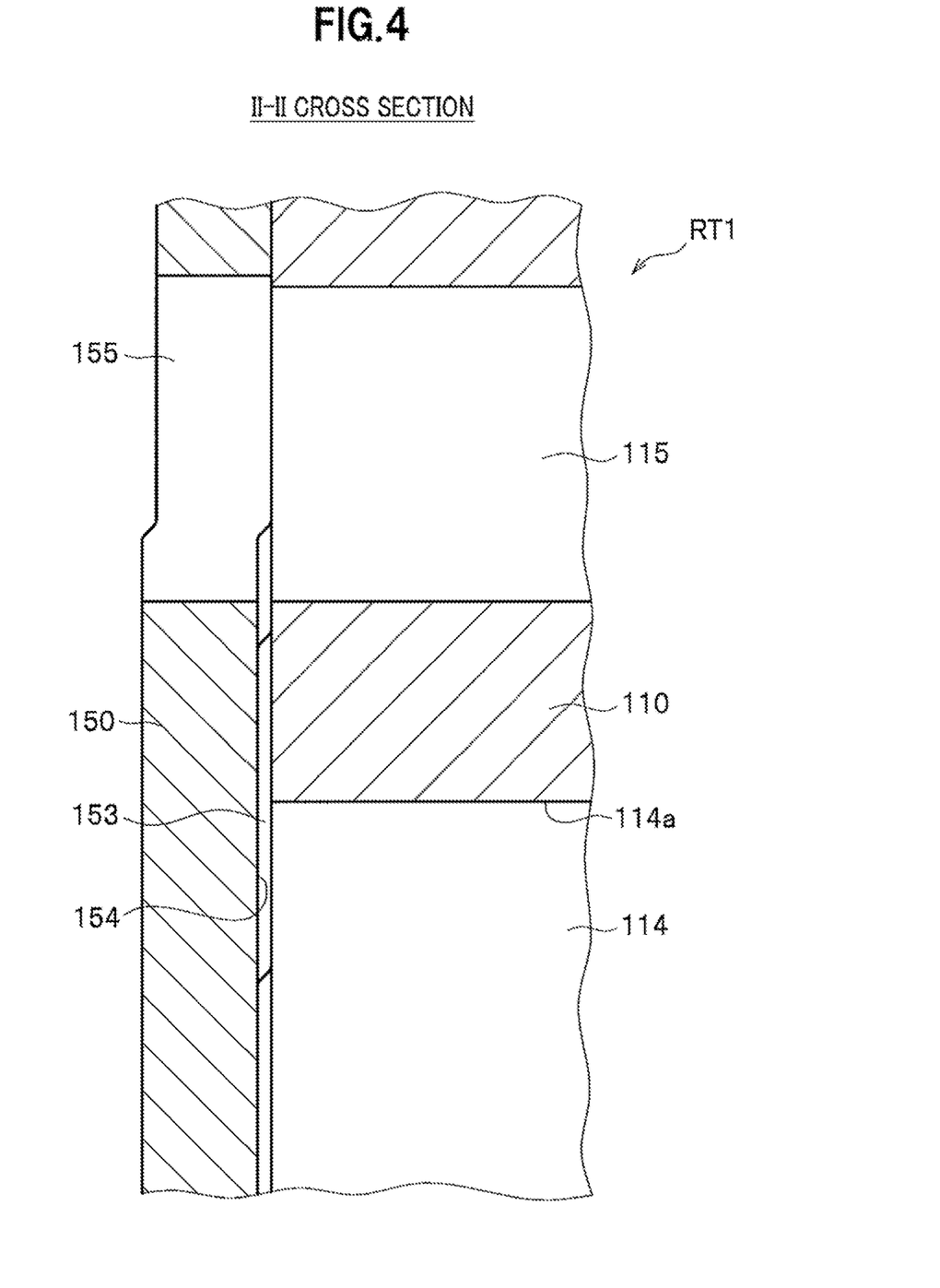
FIG. 4 is a cross-sectional view taken along the II-II line in FIG. 1.

FIG. 4 is a cross-sectional view taken along the II-II in FIG. 1.

The right surface of the end plate 150 is formed with a recessed part 154 that is set further back in a substantially annular shape than the rest of the right surface. Moreover, the recessed part 154 has projecting parts 153 formed at arbitrary positions thereon, which project rightward and abut on the rotor yoke 110. The projecting parts 153 abut on the rotor yoke 110, thereby holding clearance between the recessed part 154 and the rotor yoke 110.

In FIG. 1, during the rotation of the rotor RT1, the centrifugal force collects the cooling oil in the cavities 114 and the cavities 113 (see FIG. 1) onto the outer peripheral surfaces 113a, 114a. The centrifugal force further makes the resultant cooling oil reach the through-holes 155 along the recessed part 154 illustrated in FIG. 4, and discharges the cooling oil to the outside of the rotor RT1 via the through-holes 155.

Figure 5:
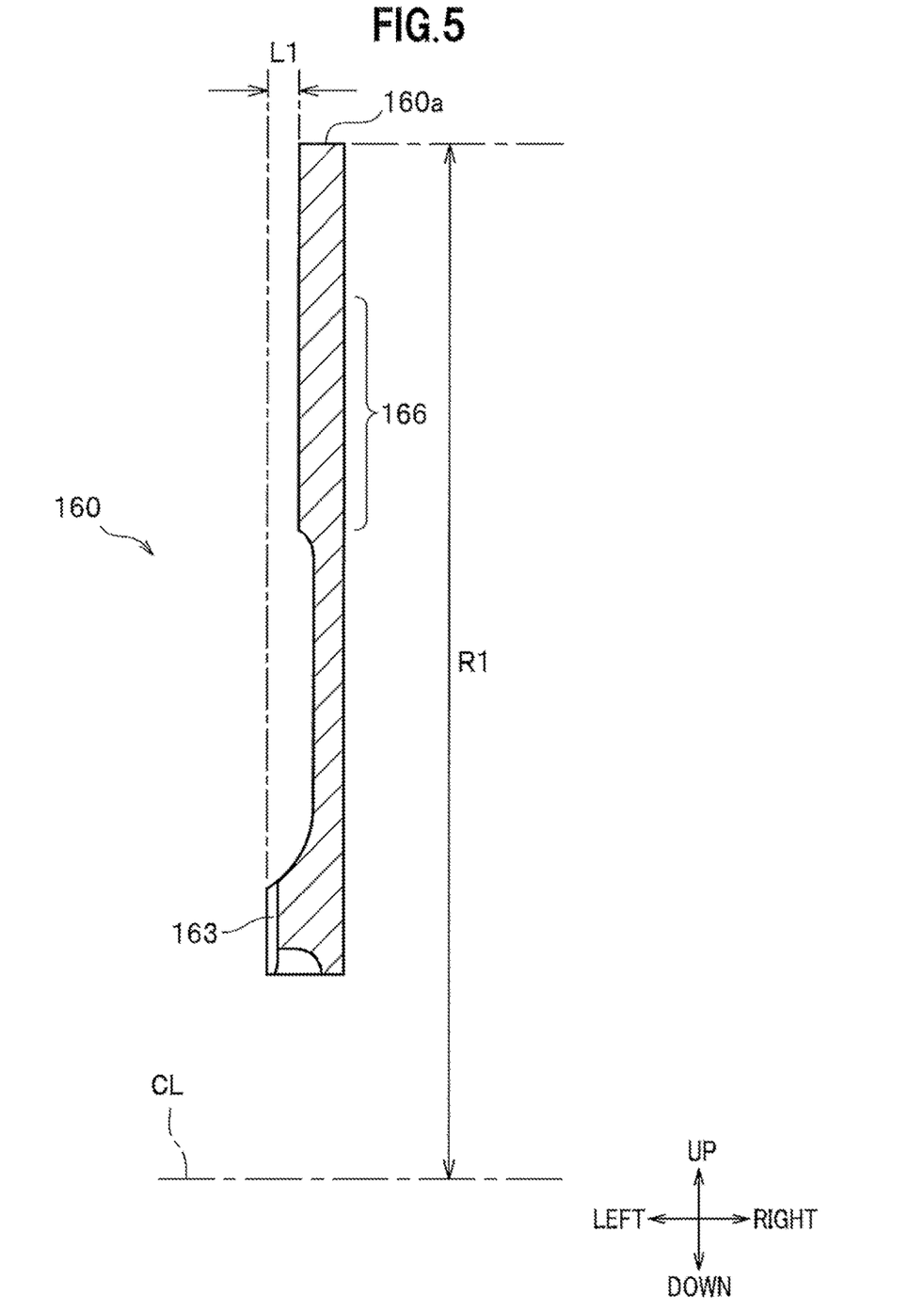
FIG. 5 is a schematic cross-sectional view of an endplate.

FIG. 5 is a schematic cross-sectional view of the end plate 160.

Incidentally, FIG. 5 exaggeratedly illustrates the recesses and protrusions of the parts on the end plate 160.

In FIG. 5, a central axis of the shaft 100 (see FIG. 1) is denoted with reference sign CL, while a radius of the end plate 160 from the central axis CL to an outer peripheral end 160a of the end plate 160 is denoted with reference sign R1. The flat part 166 is set further back in the right direction by an offset value L1 than a leftmost position of the endplate 160, that is to say, leftmost positions of the respective projecting parts 163. In a specific example considered in the embodiment, it is desirable that the offset value L1 [mm] (millimeters) be set within a range equal to or greater than 0.2 but equal to or less than 0.6, and it is more desirable that the offset value L1 be set within a range equal to or greater than 0.35 but equal to or less than 0.48. The reason for this setting will be described later.

Figure 6:
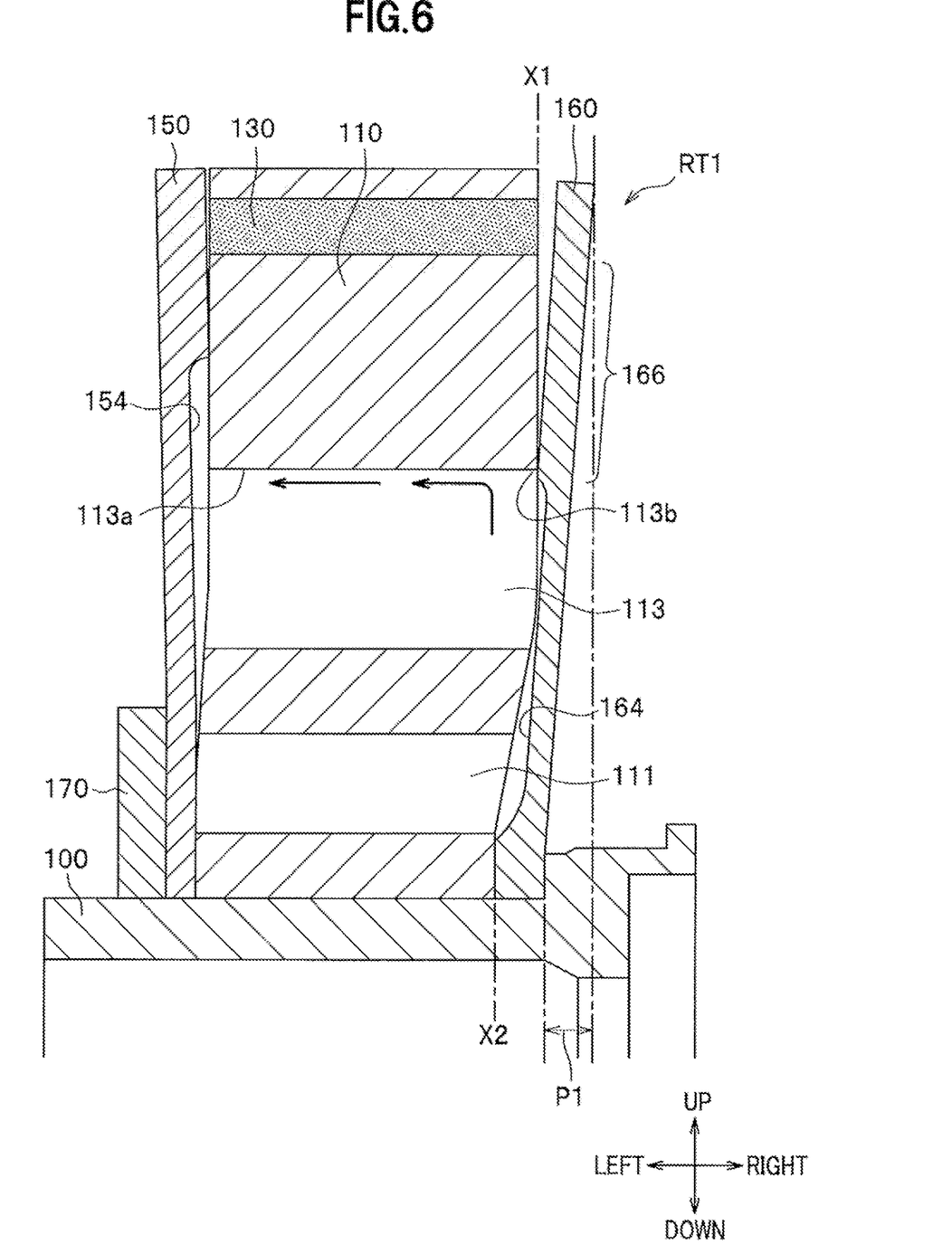
FIG. 6 is a schematic view of the rotor with a warped rotor yoke.

FIG. 6 is a schematic view of the rotor RT1 with the warped rotor yoke 110 warped in the embodiment.

As described above, the rotor yoke 110 is obtained by: stacking the electromagnetic steel plates formed in substantially the same shape; and joining the electromagnetic steel plates together by swaging, bonding, or welding. This makes the electromagnetic steel plates easy to warp in the axial direction in portions (for example, portions around the cavities 113, 114 in FIG. 1) of the rotor yoke 110 where the density of the electromagnetic steel plates is lower than that of the rest of the rotor yoke 110. This means that the rotor yoke 110 as whole easily warps in the axial direction, particularly around the cavities 113, 114.

It should be noted that FIG. 6 exaggeratedly illustrates the warps, recesses and protrusions of the parts of the rotor RT1.

For example, when general electromagnetic steel plates are used for the rotor yoke 110, the radius R1 (see FIG. 5) is 95 [mm], and a clamping margin for the press-fit ring 170 is approximately 0.05 to 0.1 [mm], a warp amount P1 of the endplate 160 is approximately 0.6 to 1.2 [mm].

In this case, as described above, when the offset value L1 [mm] is set equal to or greater than 0.2 but equal to or less than 0.6, the offset value L1 turns an end part 113b (a sealing part) of the outer peripheral surface 113a of each cavity 113 into an angled part. This brings the rotor yoke 110 into contact with the end plate 160 at the end part 113b. When the end part 113b turns into the angled part to abut on the flat part 166, the cooling oil is sealed with the end part 113b and becomes less likely to leak toward the outer periphery. In other words, the end part 113b functions as the sealing part. Furthermore, when the offset value L1 illustrate in FIG. 5 is set equal to or greater than 0.35 but equal to or less than 0.48, the cooling oil can be more appropriately sealed with the end part 113b.

Meanwhile, an end portion of the outer peripheral surface 114a (see FIG. 1) of each cavity 114 similarly turns into an angled part, that is, a sealing part, and goes into contact with the end plate 160. Thus, the angled parts along the circular passage extending along the outer peripheral surfaces 113a, 114a in the rotor yoke 110 go into contact with the end plate 160. In this respect, a general expression of a relationship between the offset value L1 and the warp amount P1 shows it is desirable that the offset value L1 be determined relative to the warp amount P1 such that P1/L1 falls within a range of 1 to 6, and more desirably such that the P1/L1 falls within a range of 2 to 3.

Furthermore, in FIG. 6, reference sign X1 denotes an axial-direction position where the end part 113b serving as the sealing part appears, and reference sign X2 denotes a position where the end plate 160 abuts on the rotor yoke 110 while touching the shaft 100. The positions X1, X2 are away from each other by the above-described offset value L1 or more.

Working in First Embodiment

Figure 7:
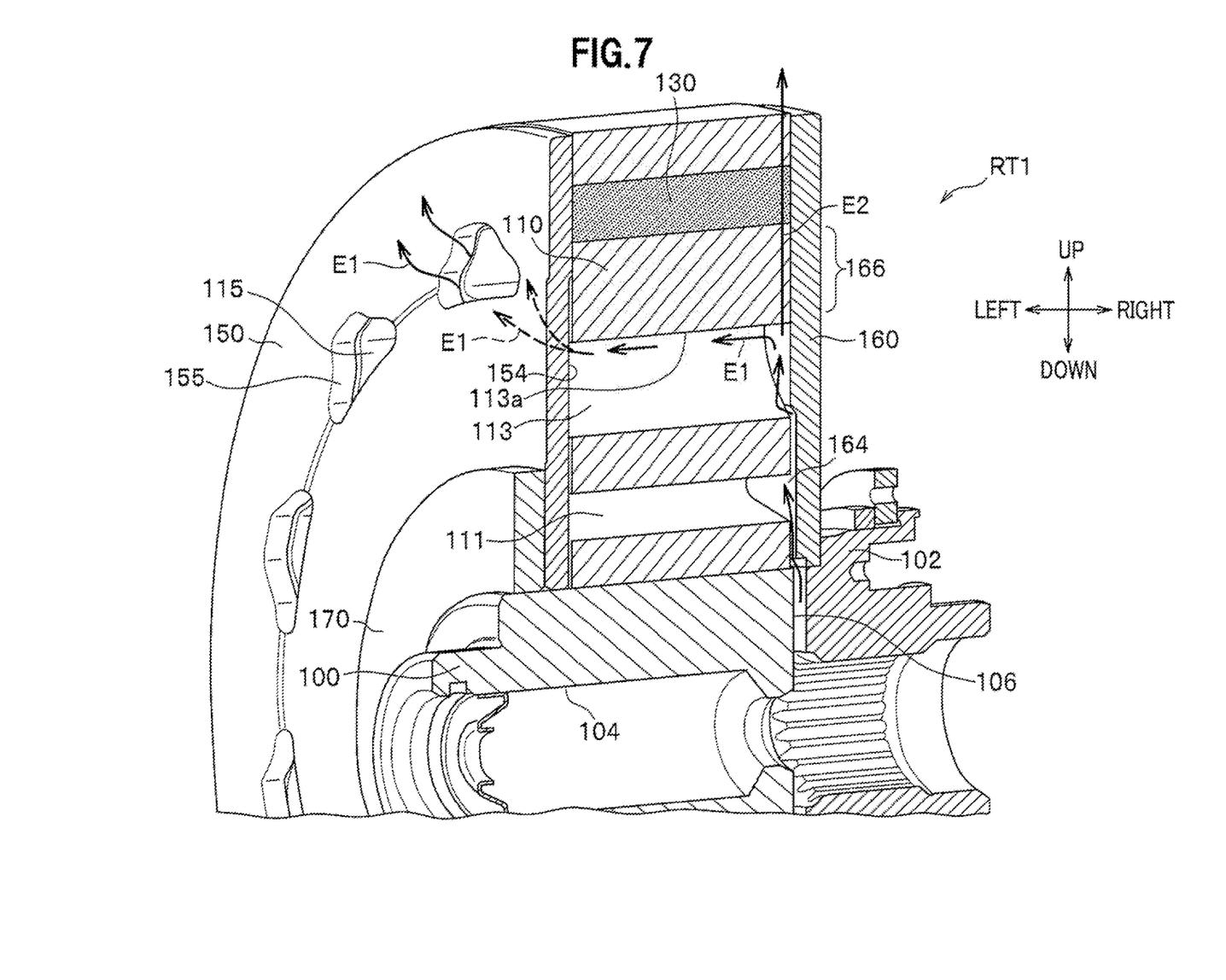
FIG. 7 is a perspective cutaway view of the rotor according to the embodiment.

Next, referring to FIG. 7, descriptions will be provided for how the first embodiment works. Incidentally, FIG. 7 is a perspective cutaway view of the rotor RT1 according to the embodiment.

In FIG. 7, the rotation of the rotor RT1 makes the cooling oil in the hollow part 104 reach the recessed part 164 via the cooling oil feeding hole(s) 106. After reaching the recessed part 164, the cooling oil goes toward the outer peripheral surfaces 113a, 114a of the cavities 113, 114 illustrated in FIG. 1. As described above using FIG. 6, the rotor yoke 110 and the endplate 160 go into contact with each other along the circular passage extending along the outer peripheral surfaces 113a, 114a, and thus seal the cooling oil. In other words, a flow of the cooling oil along the flat part 166 toward the outer periphery is inhibited.

Thus, after reaching the cavities 113, 114, the cooling oil flows along the outer peripheral surfaces 113a, 114a in a direction from the right to left, as indicated with passages E1 in FIG. 7, and reaches the recess part 154. Specifically, even in the case where as illustrated in FIG. 6, the rotor yoke 110 is warped, appropriate passages for the cooling oil to flow in the direction from the right to left can be formed inside the rotor yoke 110. After reaching the recessed part 154 of the endplate 150, the cooling oil is discharged to the outside of the rotor RT1 via the through-holes 155.

COMPARATIVE EXAMPLE

Next, a configuration of a comparative example will be described for the purpose of clarifying what effects the embodiment brings about. The configuration of the comparative example is the same as that of the embodiment, except that the offset value L1 (see FIG. 5) is equal to 0.

A problem with the comparative example is that the angled parts (for example, the end parts 113b shown in FIG. 6) are less likely to be formed in places where the end plate 150 and the flat part 166 go into contact with each other. Thus, after reaching the cavities 113 and the cavities 114 (see FIG. 1), the cooling oil leaks along a passage E2 illustrated in FIG. 7 at a large rate. Specifically, the cooling oil contacts substantially only the right surface of the rotor yoke 110, and cools only the right surface thereof. This makes it impossible to cool the inside of the rotor yoke 110 sufficiently.

Effects of First Embodiment

As described above, the rotor RT1 according to the embodiment includes: the shaft (100) that allows the cooling oil to flow therein; the substantially cylindrical rotor yoke (110) fitted over the shaft (100); the magnets (130) fitted to the rotor yoke (110); and the first end plate (160) abutting on one end of the rotor yoke (110). The rotor yoke (110) includes the cooling oil passages (113, 114) which are formed on the radially inner side of the magnets (130) and allow the cooling oil to flow in the axial direction. The rotor yoke (110) receives the pressing force in the axial direction via the first end plate (160). The rotor yoke (110) and the first end plate (160) form the sealing parts (113b) for sealing the cooling oil in the sections positioned between the cooling oil passages (113, 114) and the magnets (130) in the radial direction.

Thus, the rotor RT1 is capable of: making the cooling oil flow to the cooling oil passages (113, 114); and cooling the rotor RT1 appropriately.

Furthermore, the embodiment is characterized in that: the first end plate (160) is deformed so as to allow an outer peripheral portion thereof to warp in the axial direction of the shaft (100); and the sealing parts (113b) are the angled parts of the rotor yoke (110) which are pressed by the first end plate (160).

Thus, even in a case where the areas of the sealing parts (113b) are small, the embodiment can make the cooling oil flow to the cooling oil passages (113, 114), and can cool the rotor RT1 more appropriately.

Moreover, in the embodiment, the axial-direction position (X1) where each sealing part (113b) is formed and the position (X2) where the first end plate (160) abuts on the rotor yoke (110) while contacting the shaft (100) are away from each other by the predetermined offset value (L1).

Thus, the embodiment can determine the positions of the respective sealing parts (113b) depending on the warp of the rotor yoke (110).

Second Embodiment

Figure 8:
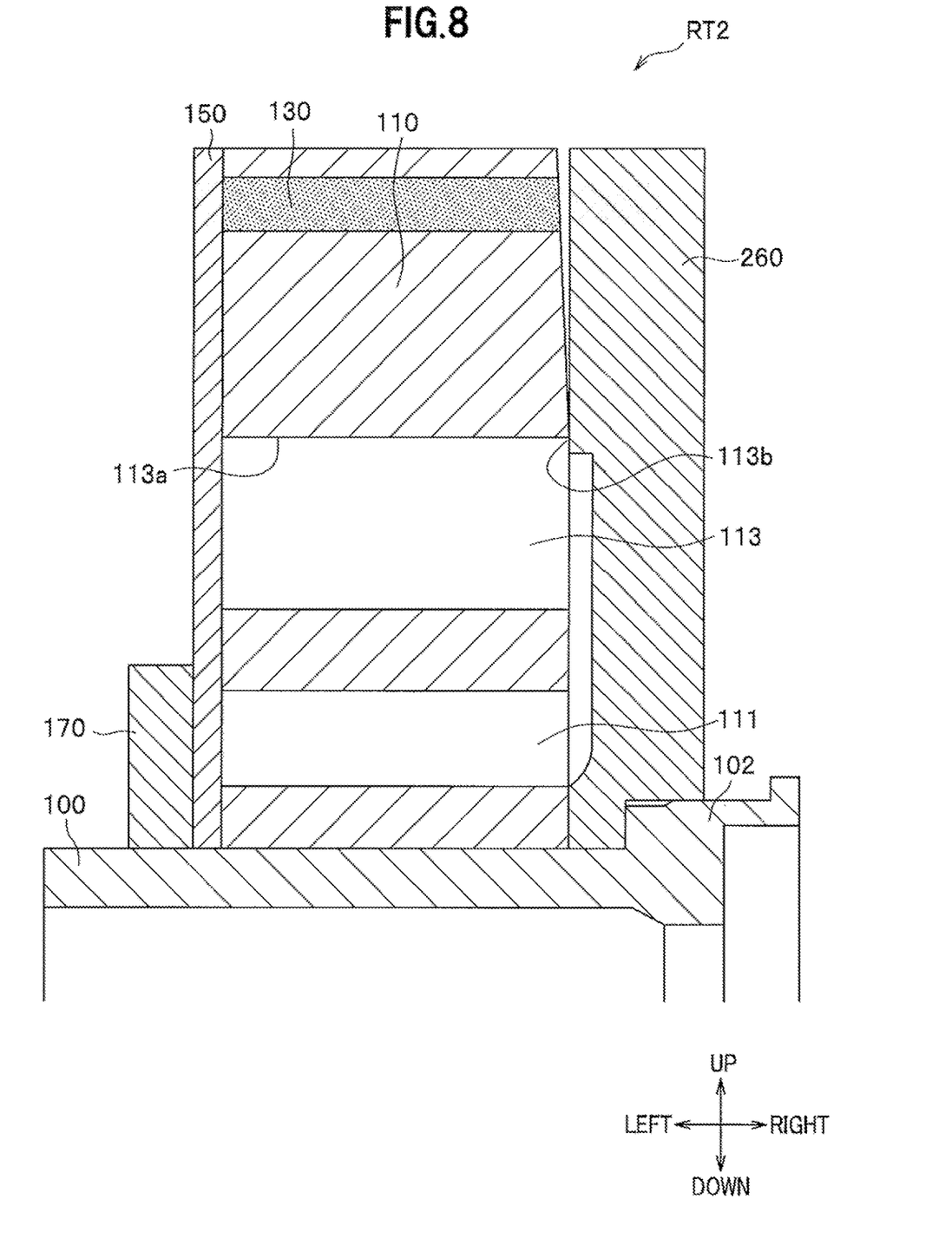
FIG. 8 is a schematic view of a rotor according to a second embodiment of the present invention.

FIG. 8 is a schematic view of a rotor RT2 according to a second embodiment of the present invention.

Instead of the end plate 160 in the rotor RT1 according to the first embodiment, an end plate 260 is applied to the rotor RT2 according to the second embodiment. The offset value L1 (see FIG. 5) in the end plate 260 is equal to 0. It should be noted that the warp amount P1 (see FIG. 6) in the end plate 260 is substantially equal to 0 since the end plate 260 has greater rigidity than the end plate 160.

Since the warp amount P1 is equal to 0, the embodiment enables the end parts 113b of the respective cavities 113 to serve as the angled parts and go into contact with the end plate 260. Thus, even though the offset value L1 is equal to 0, the second embodiment can seal the cooling oil appropriately like the first embodiment.

Third Embodiment

Figure 9:
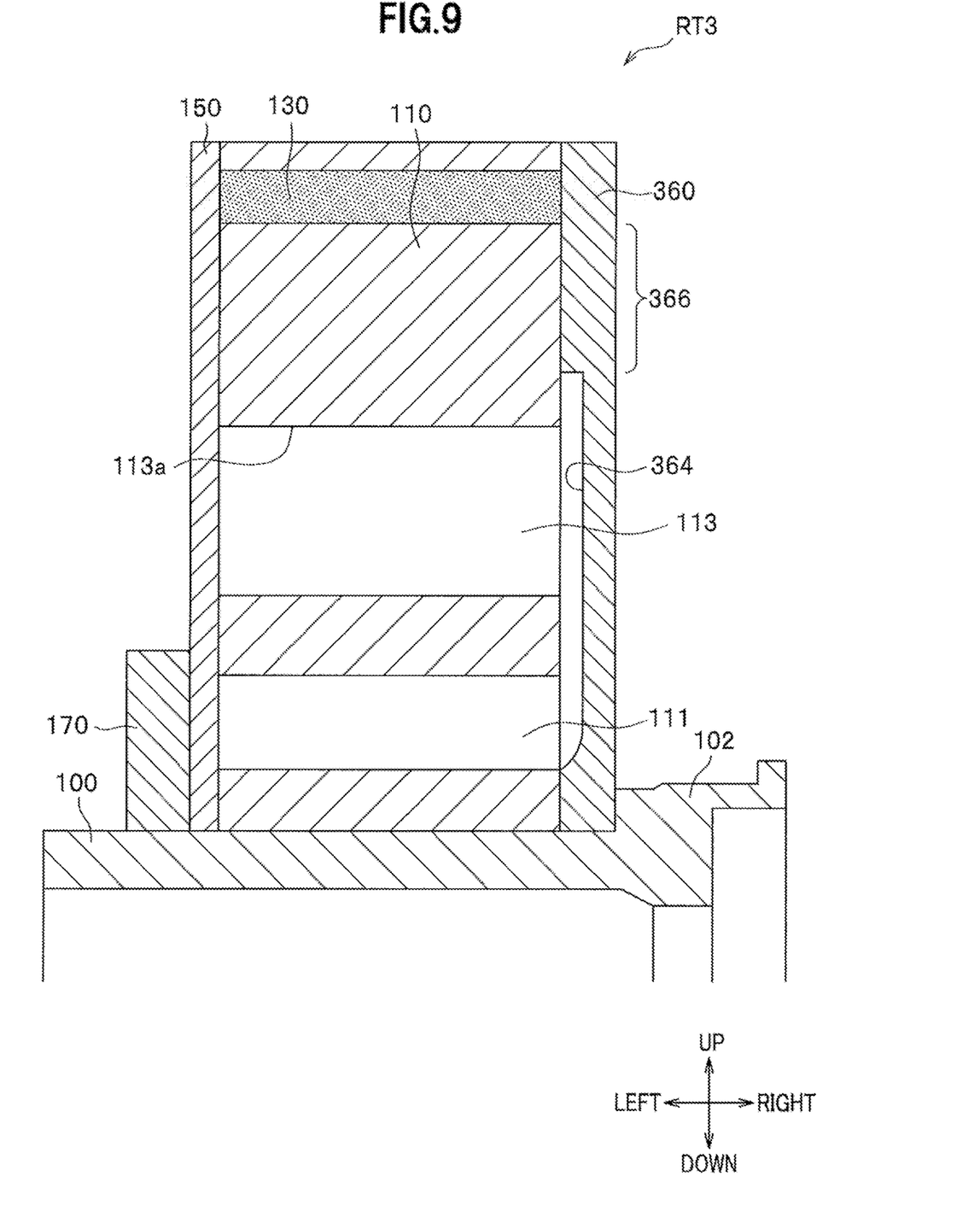
FIG. 9 is a schematic view of a rotor according to a third embodiment of the present invention.

FIG. 9 is a schematic view of a rotor RT3 according to a third embodiment of the present invention.

Instead of the end plate 160 in the rotor RT1 according to the first embodiment, an end plate 360 is applied to the rotor RT3 according to the third embodiment. Like the recessed part 164 (see FIG. 3), a recessed part 364 is formed in the end plate 360. Incidentally, an upper end portion of the recessed part 364 is located on the radially outer side of the outer peripheral surfaces 113a of the respective cavities 113. In response to this, a plat part 366 of the end plate 360 is also located on the radially outer side of the outer peripheral surfaces 113a of the respective cavities 113.

As described above, the pressing force from the press-fit ring 170 makes the rotor yoke 110 easy to warp in the axial direction. In the portion of the rotor yoke 110 which is located on the radially outer side of the cavities 113, 114 (see FIG. 1), however, a ratio of the total area of the cavities 115 to 118 to that of the rest of the portion of the rotor yoke 110 is relatively small. This makes the density of the electromagnetic steel plates therein higher. The rotor yoke 110 is therefore less likely to warp in its area around the cavities 115 to 118. Thus, the right end surface of a portion of the rotor yoke 110 which is located on the radially outer side of the cavities 113 in FIG. 9 may be handled as a flat surface in some cases.

In such cases, the surface of the flat part 366 of the endplate 360 is formed to correspond to the flat surface which appears on the right end surface of the rotor yoke 110. Thus, the flat part 366 enables the rotor yoke 110 and the end plate 360 to go into surface contact with each other. The flat part 366 can therefore seal the cooling oil more appropriately. Specifically, the embodiment can make the entirety of the flat part 366 having a predetermined width in the radial direction serve as a sealing part.

As described above, the embodiment can make the sealing part (366) of the surface having the predetermined width in the radial direction. Thus, the cooling oil can be sealed more appropriately.

The present embodiment further includes the second end plate (150) abutting on the other end of the rotor yoke (110). The cooling oil passages (113, 114) make the cooling oil flow from the first end plate (360) to the second end plate (150), and the sealing part (366) is formed on the radially outer side of the cooling oil passages (113, 114). This makes it possible to hold the sealing part (366) flat, and to seal the cooling oil more appropriately.

MODIFICATIONS

The present invention is not limited to the above embodiments, and can be variously modified. The above embodiments have been exemplified for the purpose of explaining the present invention in an easy-to-understand way, and are not necessarily limited to what include all the described configurations. In addition, an embodiment may be created based on any one of the above embodiments by replacing a part of its configuration with a part of the configuration of another embodiment, or by adding apart of the configuration of another embodiment. Otherwise, an embodiment may be created based on any one of the above embodiments by removing a part of its configuration, or by replacing apart of its configuration with a part of the configuration of another embodiment and adding a part of the configuration of another embodiment. Examples of feasible modifications to the above embodiments are as follows.

(1) Although the above embodiments have been described in which the cavities 111 to 118 are formed in the rotor yoke 110, the present invention can be applied to even a rotor yoke in which the cavities 111 to 118 are not formed because such a rotor yoke is warped when pressed.

(2) Moreover, although in the above embodiments, the magnets 130 are embedded in the cavities 116 to 118 in the rotor yoke 110, the magnets 130 may be fixed to the outer peripheral surface of the roto yoke 110.

(3) Furthermore, the above embodiments are applicable to not only vehicles but also various electric apparatuses. This application enables the electric apparatuses to cool the rotor appropriately depending on their use.

REFERENCE SIGNS LIST

100 Shaft
110 Rotor yoke
113, 114 Cavity (Cooling oil passage)
113b End part (Sealing part)
130 Magnet
150 End plate (Second end plate)
160 End plate (First end plate)
366 Flat part (Sealing part)
RT1~RT3 Rotor

The invention claimed is:

1. A rotor comprising:
a shaft that allows cooling oil to flow therein;
a substantially cylindrical rotor yoke fitted over the shaft;
a magnet fitted to the rotor yoke; and
a first end plate abutting on one end of the rotor yoke, wherein
the rotor yoke includes a cooling oil passage that is formed on a radially inner side of the magnet and allows the cooling oil to flow in an axial direction of the shaft,
the rotor yoke receives a pressing force in the axial direction via the first end plate,
the rotor yoke and the first end plate form a sealing part that seals the cooling oil, in a section positioned between the cooling oil passage and the magnet in a radial direction,
the first end plate is deformed so that an outer peripheral portion thereof warps in the axial direction, and
the sealing part is an angled part defined by an end part of an outer peripheral surface of a portion of the rotor yoke defining a cavity of the rotor yoke, the outer peripheral surface of the portion being pressed by an inner peripheral part of a flat part of the first end plate.

2. The rotor according to claim 1, wherein
the sealing part is a surface having a predetermined width in the radial direction.

3. The rotor according to claim 2, further comprising a second end plate abutting on another end of the rotor yoke, wherein
the cooling oil passage allows the cooling oil to flow from the first end plate to the second end plate, and
the sealing part is formed on a radially outer side of the cooling oil passage.

4. The rotor according to claim 1, wherein
an axial-direction position where the sealing part is formed and a position where the first end plate abuts on the rotor yoke while contacting the shaft are away from each other by a predetermined offset value.

* * * * *